3,646,001
LINEAR POLYMERS OF BUTADIENE
Evalds Lasis and Nathan John McCracken, Sarnia, Ontario, Canada, assignors to Polymer Corporation Limited, Sarnia, Ontario, Canada
Filed Nov. 21, 1969, Ser. No. 878,599
Claims priority, application Canada, Dec. 5, 1968, 36,920
Int. Cl. C08d 3/04
U.S. Cl. 260—94.3          8 Claims

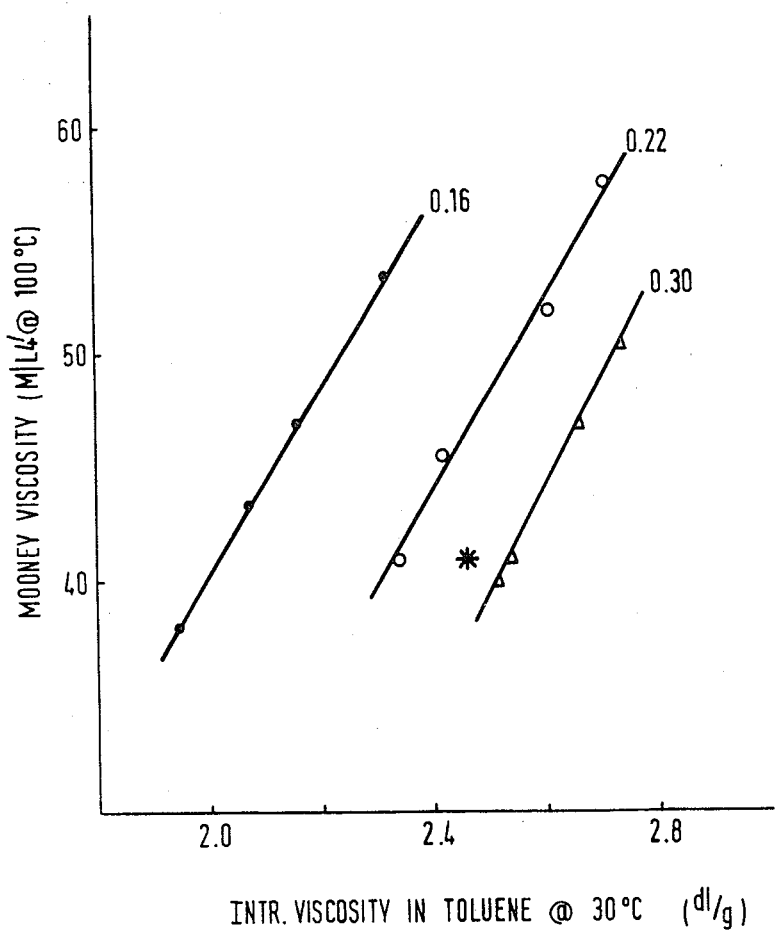

ABSTRACT OF THE DISCLOSURE

Polymers of butadiene-1,3 of a predetermined linearity and having more than 95% of the butadiene units in the cis-1,4 configuration are prepared by polymerizing butadiene-1,3 in the presence of a soluble catalyst comprising a Group VIII metal compound, preferably a cobalt compound, organoaluminum compound and water. The Group VIII metal compound and water, both dissolved in an inert organic liquid, are mixed preferably prior to the addition of the aluminum compound, the aluminum compound is then admixed in the absence of butadiene-1,3 and the mixture is reacted and, if desired, stored at a temperature not more than about 20° C.

---

This invention relates to the production of cis-1,4 polymers of butadiene. In particular, it relates to an improved method of producing cis-1,4 polybutadienes having a predetermined linearity.

Butadiene-1,3 has been polymerized in an anhydrous system using a mixed catalyst consisting of a Group VIII metal compound, e.g. $CoCl_2$, and an organo-metallic compound, e.g. aluminum alkyl chloride. Polymers produced in such reaction have a high degree of stereoregularity in microstructure with more than 95% of units in the cis-1,4 configuration and are valued in the production of heavy duty tires and other rubber goods. Unfortunately, the polymerization reaction is highly irreproducible with the reaction rate, yield and the quality of the product varying widely, much wider than is desirable in commercial operations. The product is highly gelled or significantly branched. The reproducibility has been improved somewhat by polymerizing butadiene-1,3 in the presence of small amounts of water.

According to the prior art processes, the water may be introduced into the reacting system in a number of ways. For instance, the water may be first contacted with an organo-aluminum compound to form an oxygenated aluminum product and then this product is added to butadiene along with the separately added cobalt salt to initiate the polymerization of butadiene. The oxygenated product is partially soluble in the reaction medium and its colloidal particles are believed to act as nuclei for the formation of gelled polymer. In another process modification, the two catalyst components are pre-reacted in an anhydrous solvent, optionally in the presence of small amount of butadiene, and then the catalyst is added to the mixture containing monomer, solvent and water to initiate the polymerization reaction. The pre-reaction is difficult to control; depending on the catalyst components, it is either too vigorous and produces a catalyst mixture of reduced activity or it is too slow requiring prolonged heating at elevated temperatures to make it catalytically active and partially soluble. Irrespective of the preparation method, the catalysts of the prior art produce butadiene polymers that are branched and/or contain sigfinificant amounts of gel. This swollen gel strongly adheres to the reactor walls and builds up rapidly causing a reduction in the heat transfer. It also deposits in constricted areas such as transfer lines and valves limiting and prematurely stopping the flow in the continuously operated systems.

In accordance with this invention, there is provided an improved process of producing a cis-1,4 polymer of butadiene-1,3 in the presence of a catalyst comprising a mixture of a metal compound of a Group VIII metal of the Periodic Table and an organo-aluminum compound, the improvement which comprises (1) reacting at a temperature of not more than about 20° C. said metal compound and said aluminum compound, both said compounds being dissolved in an inert organic liquid, said reaction being carried out in the presence of less than 1.0 mole per mole of aluminum compound of water dissolved in said organic liquid whereby a soluble catalyst is produced, (2) contacting butadiene-1,3 with said catalyst and (3) polymerizing said butadiene-1,3 to a conversion of at least 35%.

The linearity of the polymer is determined by the amount of water present in the soluble catalyst. At a level of about at least 0.3 mole of water per mole of the aluminum hydrocarbyl halide, the polymer of butadiene of this invention is highly linear; it is at least as linear as the polymer of butadiene produced in the presence of iodine-containing titanium-based co-ordination catalyst and containing less than 95% of butadiene units in the cis-1,4 configuration. The present invention thus provides a novel linear polymer of butadiene-1,3 in which more than 95% of the butadiene-1,3 monomer units are in the cis-1,4 configuration.

According to van der Hoff et al. (Rubber and Plastics Age, 1965, Volume 46, No. 7, pages 821–827), the degree of branching or linearity of polymers is reflected in the value of the exponential constant $\alpha$ in the Mark-Houwink equation: $[\eta]=KM^\alpha$ where $[\eta]$ is the intrinsic viscosity, M is the viscosity average molecular weight of the polymer and K and $\alpha$ are constants for a given polymer-solvent system. The value of $\alpha$ may be calculated by different methods as shown by van der Hoff et al. in Table VI. When calculated from the Mooney viscosity data, it ranges from a high of 0.88 for the linear polybutadiene to a low of 0.68 for the branched cobalt-catalyzed polybutadiene. In pratice, the calculation of $\alpha$ is too tedious; for the estimation of relative linearity of gel-free polymers having similar molecular weight distribution it is sufficient to relate Mooney viscosity and intrinsic viscosity data. At a given Mooney viscosity, linear polymers show significantly higher intrinsic viscosity than branched polymers. For example, a linear stereospecific polybutadiene having a narrow molecular weight distribution (M.W.D.) and a Mooney viscosity (M/L 4' at 100° C.) of 40 has an intrinsic viscosity about 2.6 dl./g. measured in toluene at 30° C.; the branched cobalt catalyzed polybutadiene of the prior art of similar M.W.D. and the same Mooney has an intrinsic viscosity of about 2.0 dl./g.

FIG. 1 represents the relationship of Mooney viscosity versus intrinsic viscosity for cis-1,4 polybutadienes of different linearity.

The invention may be used for the polymerization of butadiene-1,3 preferably alone to produce linear homopolymers of a high cis-1,4 content, or, if desirable, in the presence of a minor amount of a hydrocarbon comonomer copolymerizable with butadiene-1,3 to form copolymers in which the butadiene-1,3 units are essentially in the cis-1,4 configuration. Examples of suitable comonomers are isoprene, piperylene. The minor amount is preferably not more than about 25 percent by weight of total monomers.

The polymerization of butadiene-1,3 is preferably carried out in the presence of a non-reactive organic liquid which is a solvent for the monomer and polymer and for the catalyst prepared as described hereinbelow. Suitable organic liquids that may be used as the polymerization medium are the hydrocarbon solvents such as aromatic, aliphatic, alicyclic hydrocarbons containing 4–8 carbon atoms or mixtures thereof or chlorinated hydrocarbons containing 2–6 carbon atoms or mixtures thereof. Examples of suitable solvents are n-butane, n-butenes, normal and branched pentanes, hexanes, heptanes, octanes and monoolefinic analogues thereof, benzene, toluene, xylenes, cyclohexane, methyl cyclohexane, ethylene chloride, chlorobenzene. The lower aliphatic hydrocarbons being relatively poor solvents for the butadiene polymer are preferred, when it is desired to maintain low solution viscosity at relatively high polymer concentration. Aromatic hydrocarbons being good solvents for the butadiene polymers are preferred, when polymers of higher molecular weight are to be produced. In practice, however, mixed solvents are advantageously used; a proper combination of good and poor solvents permits the process to be conveniently adjusted to produce polymers of desired molecular weight at a reasonable rate.

The amount of the non-reactive organic liquid may vary within wide limits, from a fraction of the weight of monomer to about 20 times the monomer weight. When it is desired to maintain the volume of volatile materials to be recovered at a minimum, the non-reactive organic liquid is used in small proportions primarily as a solvent for the preparation of catalyst. High amounts of the organic liquid are used when it is essential to maintain a low solution viscosity and a low polymer solids content in the resulting polymer solution. Under preferred conditions, the organic liquid solvent is used in amounts from about 2 to about 6 parts by weight per one part by weight of butadiene-1,3. Aromatic hydrocarbons such as benzene are preferably present as one component in the non-reactive organic liquid in amounts between 20 and 100 percent by weight. The organic liquid must be essentially anhydrous, that is, dried by azeotropic distillation, treatment with silica gel, activated alumina, molecular sieves and/or metallo-organic compounds such as $AlR_3$ or alkali metal to a degree such that moisture cannot be detected with the Karl Fischer reagent. The non-reactive organic liquid may be added to the reactor separately or first premixed with butadiene-1,3 and then the mixture is contacted in the reactor with a catalyst introduced separately as a single preformed solution.

The catalyst is prepared by mixing three essential components. All the components are dissolved in the non-reactive organic liquid such as described hereinabove and preferably in hydrocarbons such as benzene, toluene, hexane or mixtures thereof. The first component is a compound of a Group VIII metal of the Periodic Table such as cobalt or nickel salt of an organic acid, preferably a long chain organic acid, such as hexanoic acid, octanoic acid, dodecanoic acid, octadecanoic acid, octadecenoic acid, enolic form of acetylacetone, benzoic acid, naphthoic acid, sulphonic acids of hydrocarbons containing 6–20 carbon atoms, phosphinic acids with alkyl or aryl substituents. The hydrocarbon radicals in these acids may be aliphatic, aromatic or alicyclic and preferably are selected from those that impart solubility in a hydrocarbon solvent to the salts of these acids with the cations of Group VIII metals. Examples of such salts are cobalt (II) octanoate, cobalt (II) naphthenate, cobalt (II) stearate, cobalt (II) oleate, cobalt (II) acetylacetonate, and the corresponding salts of cobalt (III). Mixtures of cobalt and nickel salts may be used if desired for the production of polymers having certain average molecular weight and certain molecular weight distribution.

The second catalyst component is an organo-aluminum compound. An aluminum hydrocarbyl halide is preferably used containing more than one and preferably two hydrocarbyl radicals attached to aluminum. The hydrocarbyl radicals may be selected from aliphatic, alicyclic and aromatic radicals containing 2–12 carbon atoms. Satisfactory results are obtained with aluminum halides in which the hydrocarbyl is an alkyl radical such as ethyl, butyl, isobutyl or hexyl radical. The preferred halides are chlorides, although bromides may also be used. Representative examples of suitable aluminum hydrocarbyl halides are aluminum diethyl chloride, aluminum diisobutyl chloride, aluminum diamyl chloride, aluminum dihexyl chloride and the corresponding aluminum sesquichlorides and mixtures thereof.

The third component of the catalyst of this invention is water. It must be dissolved in the organic solvent before mixing with other catalyst components.

The order of the addition of the catalyst components is critical; water is mixed with cobalt salt and then the aluminum compound is added or alternatively the three components are mixed simultaneously under vigorous mixing conditions. It is important, however, that the water is not reacted with the aluminum compound in the absence of cobalt salt and/or in the presence of a polymerizable monomer such as butadiene. The temperature of mixing is also critical; it should not exceed 20° C. and preferably be not more than 15° C. This can be easily achieved by cooling one or two or all the components before mixing them. If the organic liquid medium in which the catalyst is dissolved is benzene or cyclohexane, the lowest temperature possible will be about 6° C., at which point these hydrocarbons freeze. Other hydrocarbons having considerably lower melting points permit the temperature to be between 0° C. and −30° C. The preferred temperature at which the catalyst is prepared is from about −15° C. to +13° C. When prepared under the conditions as described above, the catalyst forms a clear, transparent solution with a yellowish tinge. It can be used immediately or stored for a period that is inversely proportional to the temperature of storing. At a temperature of about 15° C., the catalyst remains soluble for about 1 hour after which time some colloidal particles are being formed and metallic mirror of cobalt is gradually deposited on glass walls. The catalyst may be stored for about 2 hours at 5° C. or for a day and longer at sub-freezing temperatures.

The amount of the catalyst which is used in the process of this invention may vary within wide limits. Expressed in terms of the amount of the aluminum hydrocarbyl halide present in the catalyst mixture, it may vary from about 0.01 part by weight per 100 parts of butadiene-1,3 to about 2 parts. It is one of the advantages of this catalyst that it permits satisfactory operation of the process at a lower than usual amount of the aluminum compound. The preferred amount of the aluminum hydrocarbyl halide is from about 0.05 to 0.5 part by weight per 100 parts by weight of butadiene. A part of this aluminum hydrocarbyl halide may be added to butadiene-1,3 and/or non-reactive organic liquid to scavenge impurities that may be present therein.

The amount of cobalt salt may also be varied within wide limits. It is usual to express the amount of cobalt salt in terms of a molar proportion to the aluminum component. It may range from about 1/2000 to about 1/4 mole per mole of the aluminum halide, although the preferred range is about 1/1000 to 1/50 mole/mole.

The amount of water used is less than 1.0 mole per mole of the organo-aluminum compound; it may range from about 0.1 to 0.5 mole per mole of aluminum compound. This amount is very small considering that the aluminum compound is used in a small quantity. Depending on the recipe, the amount of water used in the catalyst ranges from about 5 to about 100 p.p.m. based on the total weight of all ingredients in the reacting mixture. The preferred molar ratio of water to aluminum is between 0.15 and .40. When it is desired to produce a linear polymer, the amount of water should be maintained at a molar ratio of about 0.25 to 0.4 with respect to aluminum. When, on the other hand, a branched polymer is desired, that is, a polymer that branched dissolves in a solvent to produce a solution of relatively low viscosity, then the water level should be maintained at a molar ratio of about 0.15 to less than .25.

The polymerization reaction is carried out at a temperature which is conventional for such polymerizations, that is, from about −25° C. to +100° C., preferably between 0° C. and 75° C., and at a superatmospheric pressure of up to 5 atmospheres, preferably under the autogenous pressure of the volatile components in the mixture. The reaction is permitted to proceed to a conversion of butadiene-1,3 monomer of at least 30%. The linearity of the polymer also depends on the conversion; the polymerization is preferably stopped at a conversion of less than about 75%, if a highly linear polymer is desired. Higher and almost quantitative conversions of monomer are tolerated in the production of polymers which are somewhat branched. The reaction time may vary from a fraction of an hour to several hours depending on the recipe, amount of catalyst, monomer concentration, temperature, as well as on the total impurities. If desired, molecular weight modifiers such as allene, butadiene-1,2, butene-1 can be added to the reacting mixture in order to control the molecular weight of the product within predetermined limits.

The process of polymerizing may be carried out batchwise or continuously. In a batch process, butadiene-1,3 and, if desired, a comonomer, and a non-reactive organic liquid are introduced into the reactor and brought to the polymerization temperature; the preformed catalyst solution is then introduced, whereby the polymerization of butadiene is initiated and propagated. At the desired conversion, a stopper is added in a sufficient quantity to effectively stop further polymerization or further growth of the molecular weight of the polymer. In a continuous process which is usually preferred for the commercial operation, butadiene-1,3 and the preformed catalyst solution are continuously introduced into the reaction zone as two separate streams; a comonomer if such is desired and the non-reactive organic liquid may be introduced separately or combined with the butadiene-1,3 stream; the streams are then mixed in the reaction zone, butadiene is polymerized to the desired conversion and the reacting mixture is discharged into a finishing vessel where it is thoroughly mixed with sufficient amount of stopper and antioxidant prior to the conventional recovery. The process of this invention is particularly advantageous in continuous systems since it permits a prolonged operation without troublesome shutdown for cleaning of reactor walls and transfer lines.

The product of this invention, recovered in a conventional manner, is an improved polymer of butadiene-1,3 in which more than 95% of the butadiene-1,3 monomer units are in the cis-1,4 configuration. The improvement over polymers produced with the prior art cobalt catalysts is in the linearity of polymeric chains of this highly stereospecific product. The polymer of this invention is characterized by a high intrinsic viscosity for a Mooney range of about 30 to 80. The viscosity is higher than that defined by the expression $[\eta] = 2.0 + 0.023$ (Mooney −30) where $[\eta]$ is intrinsic viscosity measured in toluene at 30° C. in deciliters/gram and Mooney is the Mooney viscosity measured with a large rotor at 100° C. after 4 minutes of running at 2 r.p.m. The linear polymers of this invention produced in the presence of 0.25–0.40 mole of water per mole of aluminum in the catalyst are characterized by excellent dynamic properties in the vulcanized state. When cyclically compressed or otherwise deformed, the vulcanized linear polybutadiene shows a lower heat build-up than the cobalt catalyzed polybutadiene of the prior art, a property that is valued in heavy duty tires, especially truck tires. This property of low heat build-up of the linear polybutadiene is imparted also to its blends with natural rubber.

Having described the invention in general terms, it is further illustrated by the following examples which show the polymerization of butadiene alone according to the present invention and compare the polymers of this process with analogous polymers of the prior art.

EXAMPLE I

Butadiene-1,3 was polymerized in the presence of a preformed catalyst prepared in the following manner: 300 milliliters of a pure grade benzene which had been previously saturated with water at 20° C. was added to a 1 liter bottle. The vapour space in the bottle was flushed with nitrogen and the bottle was sealed by means of a crown cap. The following components were injected through a self-sealing perforation in the cap: 7.54 milliliters of a 1% solution of cobalt octanoate in benzene and 30.8 milliliters of a 20% solution of aluminum diethyl chloride in n-hexane. Upon mixing at room temperature, a yellowish transparent catalyst solution was formed which was used to initiate the polymerization of butadiene. The catalyst was used either immediately after mixing or was stored at a temperature of about 6° C. for a time period up to 23 hours before use.

A series of four polymerization experiments was carried out in one-liter crown-capped glass bottles which prior to capping had been thoroughly dried and flushed with dry nitrogen. A self-sealing perforation was provided in the cap through which all the ingredients were introduced in the liquid form using a syringe provided with stopcock and a syringe needle.

The bottles were approximately half filled with a mixture of thoroughly dried materials mixed in the following proportion, in parts by weight:

| | Parts |
|---|---|
| Butadiene-1,3 (99.4% pure) | 15 |
| Benzene (pure grade) | 51 |
| Butene-1 (99% pure) | 34 |

After the temperature of the mixture was adjusted to 20° C., the preformed and aged catalyst was added to each bottle in an amount corresponding to 0.6 part of aluminum diethyl chloride per 100 parts by weight of butadiene. The ageing time is indicated in the table below. The polymerization reaction was carried out at 20° C. for 90 minutes after which time about 10 milliliters of ethanol was added to inactivate the catalyst. The polymer was isolated from the solution by precipitating with an excess of ethanol, stabilized with 2,6-ditertiary butyl-4 methyl phenol and dried in vacuum.

TABLE I

| Run | Catalyst ageing time (hours) | Conversion (percent monomer) | Modified solubility test [1] | Cis-1,4 content (percent) |
|---|---|---|---|---|
| 1 | 0 | 78.9 | 4 | 97.1 |
| 2 | ⅓ | 82.3 | 0 | 96.6 |
| 3 | 1 | 79.5 | 0 | 96.3 |
| 4 | 23 | 47.7 | 0 | 96.5 |

[1] Modified solubility test discriminates between the polybutadiene which is completely soluble in styrene and polybutadienes which, although practically soluble, produce a large amount of small swollen gel particles. The figures in the 4th column of Table I represent the number of visible swollen gel particles which are retained on a filter, having a pore size of about 40–60 microns and an area of about 320 square centimeters, after filtering of 1 liter of a 5% solution of polybutadiene in styrene. The polybutadiene solutions showing less than about 10 particles are considered completely soluble; 20 or more swollen gel particles make the polymer solutions commercially unfilterable.

Table I show that the preformed catalyst of this invention effectively catalyzes the polymerization of butadiene to produce polymers which are completely soluble according to Modified Solubility Test. The activity of the catalyst aged for 23 hours at 6° C., is lower than the activity of the catalyst aged for 1 hour or less.

A comparative series of analogous experiments were carried out using a preformed catalyst in which the same ingredients were mixed in the presence of 0.5 milliliter of butadiene-1,3, i.e. about 25 moles of butadiene per mole of cobalt octanoate in the catalyst mixture. The results presented in Table II were carried out not in accordance with the process of this invention.

TABLE II

| Comparative Experiment | Catalyst ageing time (hours) | Conversion (Percent monomer) | Modified Solubility Test [1] |
|---|---|---|---|
| 1 | 0 | 76.2 | 10 |
| 2 | ½ | 73.0 | 28 |
| 3 | 1 | 72.6 | 14 |
| 4 | 24 | 68.6 | >200 |

[1] See footnote in Table I.

Table II shows that the catalyst preformed in the presence of butadiene-1,3 remained active for 24 hours and produced polymers with a high gel content.

Similarly, high gel contents were found in polybutadienes prepared using a catalyst having the same composition as the one used in Table I except that in one case it was preformed in the absence of both butadiene-1,3 and water, aged for 20 minutes at a temperature of 6° C. and added to the monomer/solvent mixture in which water was dissolved, and in another case the catalyst was prepared in situ by mixing cobalt octanoate and aluminum diethyl chloride in the monomer/solvent/water medium.

EXAMPLE II

The activity of the polymerization catalyst preformed in accordance with the invention was tested as a function of the temperature and time of ageing.

The recipe and charging procedure was the same as described in Example I for runs shown in Table I, except the catalyst charge was 0.4 part by weight of aluminum diethyl chloride per 100 parts of butadiene-1,3 instead of 0.6 part. The results are shown in Table III.

TABLE III

| Run No. | Temperature of catalyst ageing (° C.) | Ageing time (hours) | Polymer yield (percent monomer) | Remarks |
|---|---|---|---|---|
| 1 | 6 | 0 | 66 | Catalyst solution remained transparent for 3 hours. |
| 2 | 6 | 2 | 54 | |
| 3 | 6 | 3 | 51 | |
| 4 | 13 | 0 | 70 | Catalyst became translucent in 1½ hours and some solid particles were visible. |
| 5 | 13 | 1 | 42 | |
| 6 | 13 | 3 | 22 | |
| 7 | 20 | 0 | 50 | Catalyst became milky within ½ hour. |
| 8 | 20 | ½ | 29 | |
| 9 | 20 | 1½ | 15 | |

All the polymers shown in Table III except for Runs 6 and 9 were free of gel as determined by the Modified Solubility Test. The conversion data indicate that the activity of the catalyst of this invention is affected by the time and temperature at which the catalyst is stored. At 20° C. the catalyst lost half of its activity within 30 minutes, while at 13° C. a similar decrease was not observed until about 90 minutes of ageing. At 6° C. the catalyst aged slowly and retained 80% of its activity for 3 hours. Further improvement in activity was achieved when the catalyst components were cooled to about 6° C., prior to their mixing. There was a direct relationship between the activity of the catalyst and its transparency: the clear transparent solutions were highly active and produced gel-free polymers, while the translucent and milky dispersions were less active and resulted in polymers containing gel.

EXAMPLE III

A series of polymerization experiments were carried out at water to aluminum dialkyl chloride ratios varying from 0.16 to 0.37 mole per mole. The procedure of charging the reactants and of polymer recovery was as described in Example I.

The following mixture was used in these experiments:

| | Parts by weight |
|---|---|
| Butadiene-1,3 (99.4% pure) | 22 |
| Benzene—dry (pure grade) | 47 |
| Butene-1 (99% pure) | 31 |
| Butadiene-1,2 | ([1]) |

[1] Variable (between $8.8 \times 10^{-3}$ and $15.4 \times 10^{-3}$ parts by weight).

Four catalyst solutions were preformed at a temperature of about 80° C. using the following formula:

| | Milliliter |
|---|---|
| Mixture of dry and water saturated benzene | 544 |
| 1% cobalt octanoate | 7.37 |
| 20% aluminum diethyl chloride | 30.10 |

The proportion of the dry and wet benzene was varied so as to give four catalyst solutions containing 0.16, 0.22, 0.30 and 0.37 respectively, mole of water per mole of aluminum diethyl chloride. The catalyst was aged for periods from 10 to 60 minutes at 8° C. and added in an amount corresponding to 0.4 part of aluminum diethyl chloride per 100 parts of butadiene-1,3.

The results are presented in Table IV.

TABLE IV

| Run No. | Water ratio, mole/mole of $AlR_2Cl$ | Butadiene-1,2, p.p.m. of Bd-1,3 | Conversion in 90 min. (percent monomer) | Mooney (M/L 4' at 100° C.) | Intr. viscosity in toluene at 30° C. (deciliter/gram) |
|---|---|---|---|---|---|
| 1 | 0.16 | 400 | 82 | 53.5 | 2.32 |
| 2 | 0.16 | 400 | 86 | 47 | 2.16 |
| 3 | 0.16 | 400 | 82 | 43.5 | 2.07 |
| 4 | 0.16 | 400 | 82 | 38 | 1.95 |
| 5 | 0.22 | 500 | 71 | 57.5 | 2.71 |
| 6 | 0.22 | 500 | 77 | 52 | 2.61 |
| 7 | 0.22 | 700 | 66 | 45.5 | 2.42 |
| 8 | 0.22 | 700 | 70 | 41 | 2.34 |
| 9 | 0.30 | 500 | 67 | 50.5 | 2.74 |
| 10 | 0.30 | 600 | 70 | 47 | 2.66 |
| 11 | 0.30 | 700 | 66 | 41 | 2.54 |
| 12 | 0.30 | 700 | 57 | 40 | 2.51 |
| ([1]) | | | | 41.0 | 2.46 |

[1] 94% cis-1,4 polybutadiene (Control).

Polymers obtained from Runs 1–12 were all gel-free as determined by the Modified Solubility Test and contained 96.5±0.7% of butadiene units in the cis-1,4 configuration.

The relationship of the above Mooney vs. Intrinsic Viscosity data is graphically represented in FIG. I. The polybutadienes, prepared at a molar ratio of water to aluminum diethyl chloride ($AlR_2Cl$) in the catalyst of 0.16, are defined by the line on the left of the graph and marked by the number 0.16. Polybutadienes made at higher water to aluminum ratios are represented by the lines having similar slope but shifted to the right of the first line and are marked by numbers 0.22 and 0.30, respectively. The figure shows that polymers made to an intrinsic viscosity of, say, 2.4 dl./g. will have a Mooney viscosity ranging from 35 at a molar ratio of $H_2O/AlR_2Cl$ of 0.30 to 56 at a ratio of 0.16. At 0.16 mole of water/mole of aluminum diethyl chloride in the catalyst of this invention, the polymer is nearly as branched as the cobalt catalyzed polybutadienes of the prior art. However, at a ratio of 0.30 mole of $H_2O$/mole of $AlR_2Cl$, the polybutadiene of this process is approximately as linear as the prior art polybutadiene having a cis-1,4 content of 94% and shown in the graph by an asterisk(*).

What is claimed is:

1. An improved process of producing a soluble, substantially gel-free, linear polybutadiene, having more than 95% cis-1,4 content and improved dynamic properties in the vulcanized state, in the presence of a catalyst comprising a mixture of a cobalt compound and an organoaluminum compound, the improvement which comprises (1) reacting, under vigorous mixing conditions at a temperature in the range of about —15° C. up to about 20° C., water with said cobalt compound prior to the addition of said aluminum compound or water with said cobalt compound simultaneously with the addition of said aluminum compound, both said cobalt and said aluminum compounds being dissolved in an inert organic liquid, said water being present dissolved in said inert organic liquid in an amount of about 0.25–0.4 mole of water, per mole of aluminum compound, whereby a soluble catalyst is produced, (2) contacting butadiene-1,3 with said catalyst and (3) polymerizing said butadiene-1,3 to a conversion of from 30 to about 75%, thereby producing a linear cis-1,4 polybutadiene.

2. The process according to claim 1 wherein the cobalt compound is selected from cobalt (II) octanoate, cobalt (II) naphthenate, cobalt (II) stearate, cobalt (II) oleate, cobalt (II) acetylacetonate, cobalt (III) octanoate, cobalt (III) naphthenate, cobalt (III) stearate, cobalt (III) oleate and cobalt (III) acetylacetonate.

3. The process according to claim 2 wherein said reaction is carried out in the absence of butadiene-1,3.

4. The process according to claim 3 wherein the said aluminum compound is an aluminum alkyl halide, and the amount of said aluminum alkyl halide is from about 0.05 to 0.5 part by weight per 100 parts by weight of butadiene-1,3.

5. The process according to claim 3 wherein said catalyst is stored at a temperature of not more than 15° C. before contacting with butadiene-1,3.

6. The process according to claim 4 wherein the said inert organic liquid comprises benzene, and the said cobalt salt and aluminum compound are reacted at a temperature of from —15° C. to 13° C.

7. The process according to claim 4 wherein said aluminum alkyl halide is diethyl aluminum chloride.

8. The process according to claim 7 wherein the cobalt compound is cobalt (II) octanoate.

References Cited

UNITED STATES PATENTS

| | | | |
|---|---|---|---|
| 3,135,725 | 6/1964 | Carlson et al. | 260—94.3 |
| 3,480,607 | 11/1969 | Hsieh | 260—94.3 |
| 3,462,406 | 8/1969 | Natta et al. | 260—94.3 |
| 3,502,637 | 3/1970 | Marullo et al. | 260—94.3 |

OTHER REFERENCES

Gippin, "Polymerization of Butadiene with Alkylaluminum and Cobalt Chloride," Preprints, vol. 6, #4, ACS—Div. of Petroleum Chem. (Chicago), September 1961 (pp. A31–A34).

JOSEPH L. SCHOFER, Primary Examiner

R. A. GAITHER, Assistant Examiner

U.S. Cl. X.R.

260—82.1

PO-1050
(5/69)

UNITED STATES PATENT OFFICE
CERTIFICATE OF CORRECTION

Patent No. 3,646,001           Dated February 29, 1972

Inventor(s) EVALDS LASIS and NATHAN JOHN McCRACKEN

It is certified that error appears in the above-identified patent and that said Letters Patent are hereby corrected as shown below:

In Column 8, line 19, "80°" should read --8°--.

Signed and sealed this 22nd day of August 1972.

(SEAL)
Attest:

EDWARD M. FLETCHER, JR.
Attesting Officer

ROBERT GOTTSCHALK
Commissioner of Patents